June 18, 1929.    E. DEISTER    1,717,498
VIBRATING SCREEN
Original Filed Sept. 30, 1926    4 Sheets-Sheet 1

INVENTOR.
Emil Deister
BY
ATTORNEY.

June 18, 1929.   E. DEISTER   1,717,498
VIBRATING SCREEN
Original Filed Sept. 30, 1926   4 Sheets-Sheet 2

INVENTOR.
Emil Deister
BY Elwin M. Hulse
ATTORNEY.

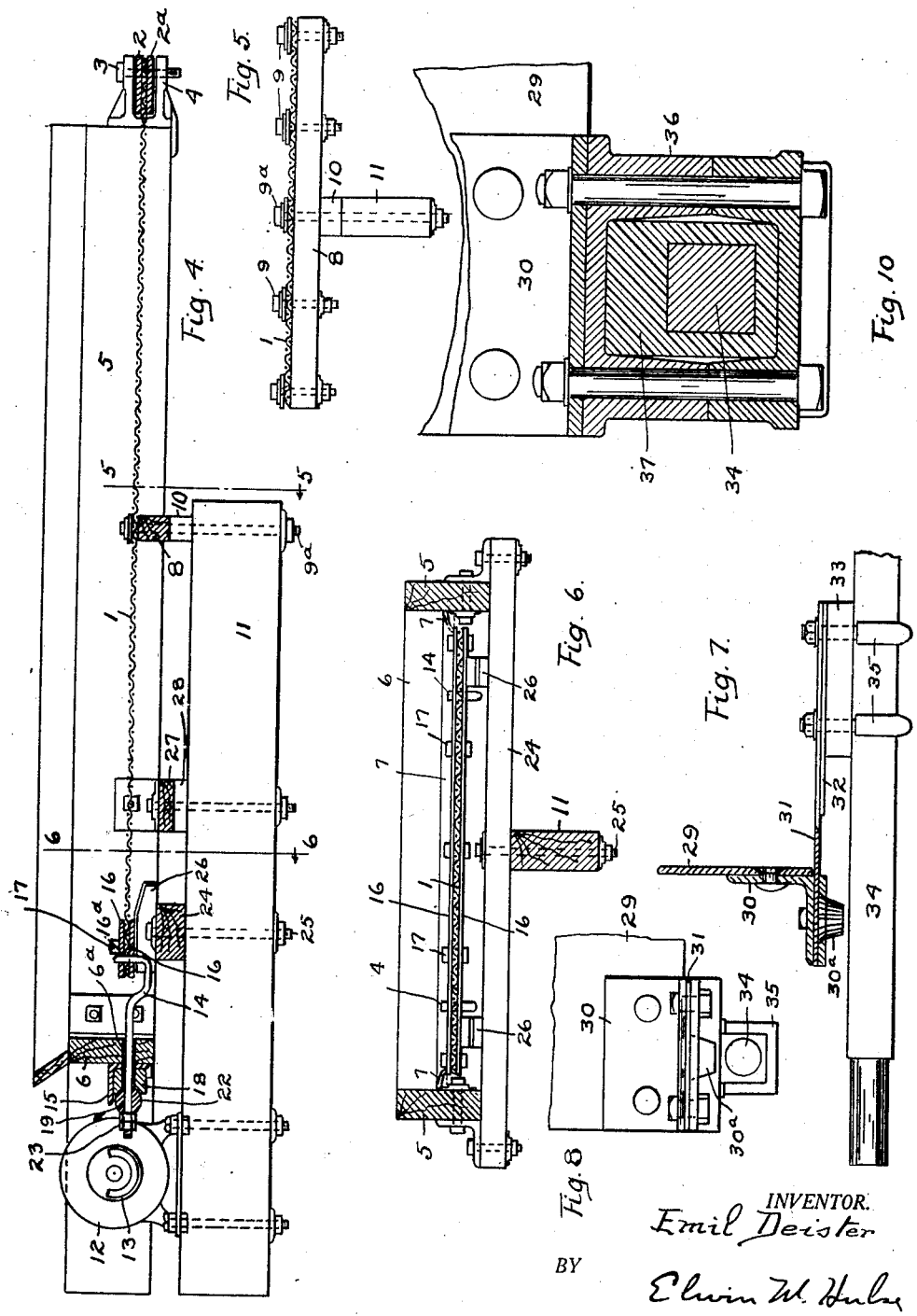

June 18, 1929.  E. DEISTER  1,717,498
VIBRATING SCREEN
Original Filed Sept. 30, 1926  4 Sheets-Sheet 4
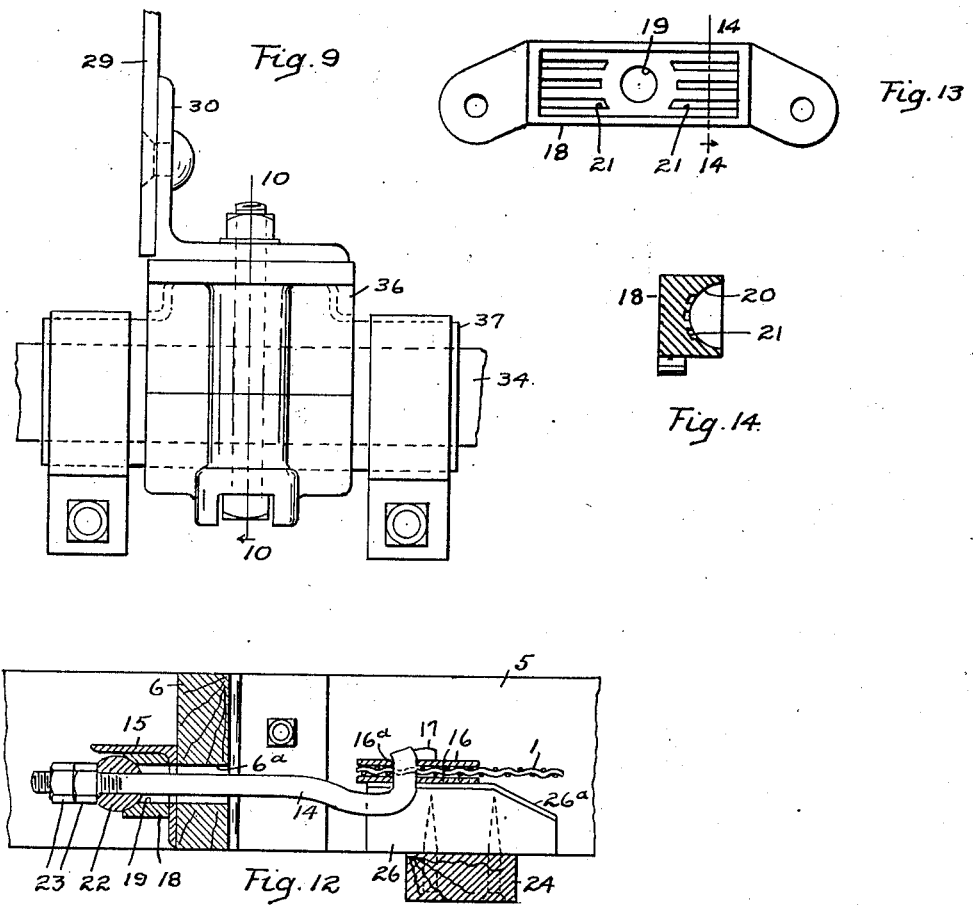
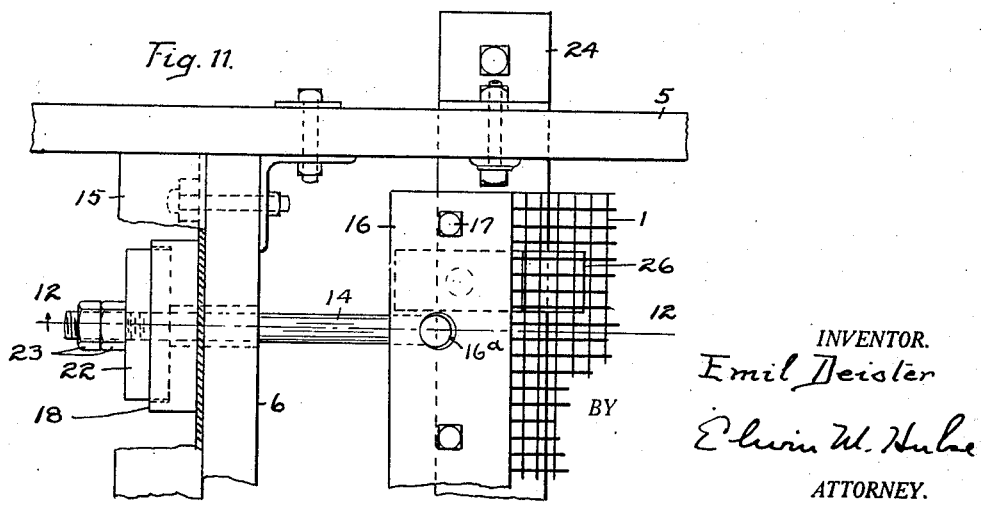
INVENTOR.
Emil Deister
BY
ATTORNEY.

Patented June 18, 1929.

1,717,498

UNITED STATES PATENT OFFICE.

EMIL DEISTER, OF FORT WAYNE, INDIANA.

VIBRATING SCREEN.

Application filed September 30, 1926, Serial No. 138,591. Renewed April 29, 1929.

The invention relates to vibrating screens.

The object of the invention is to provide a simple and economically built device which shall be highly efficient in operation and which may be portable or stationary.

The invention is illustrated in the accompanying drawings, in which

Figure 1:
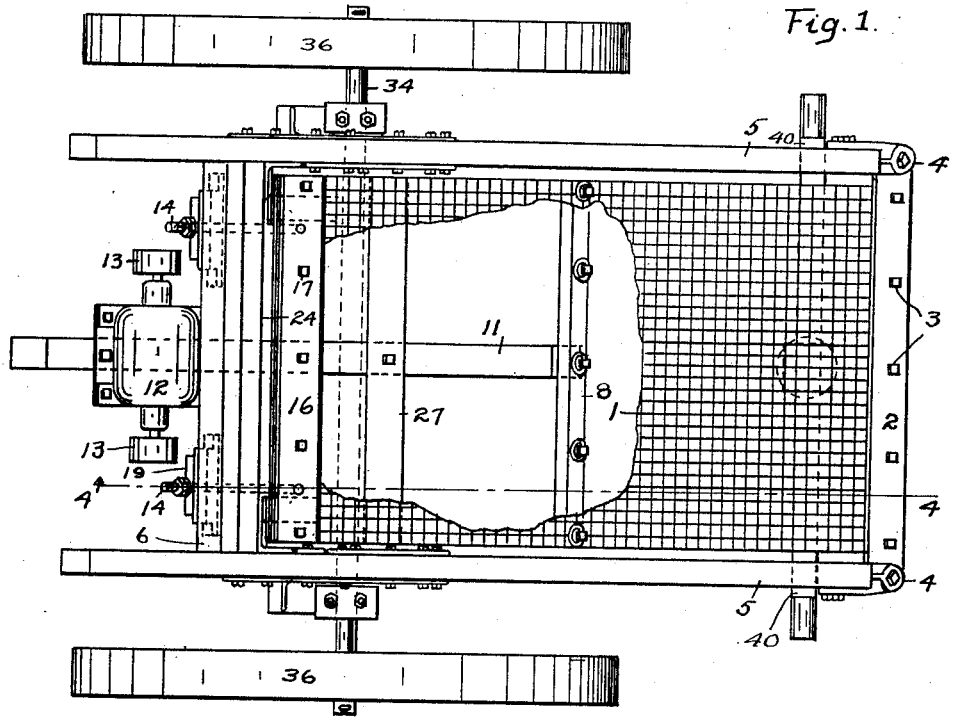
Figure 2:
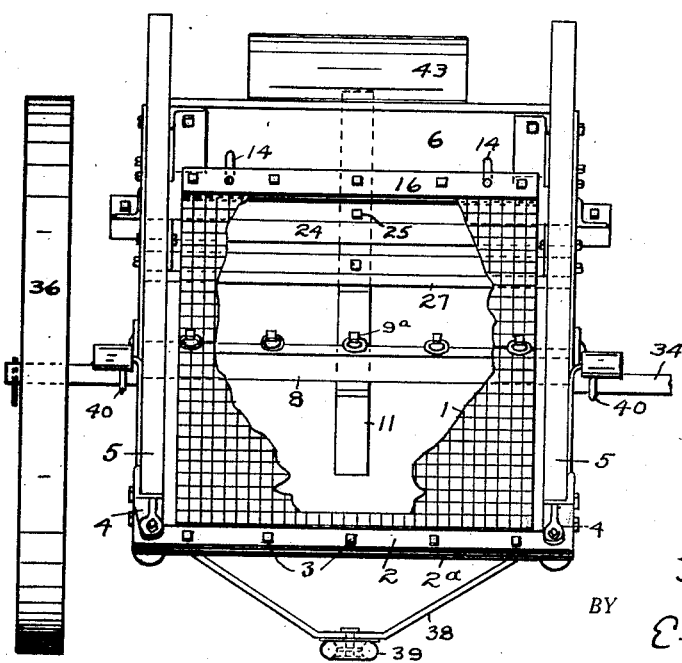
Figure 3:
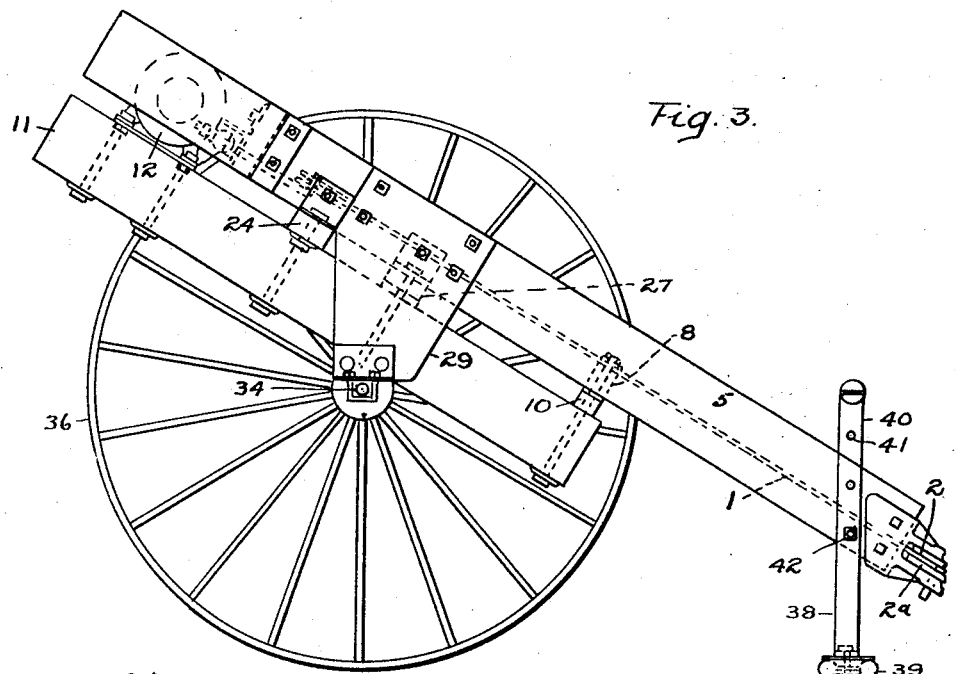
Figure 15:
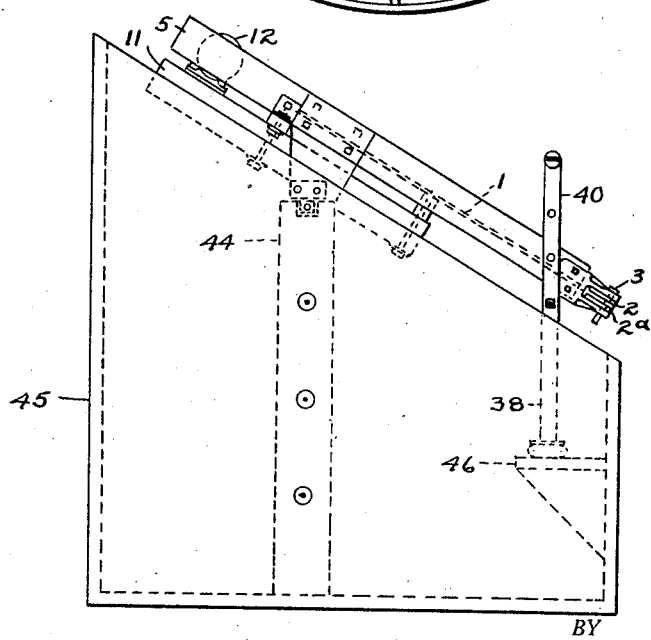

Figure 1 is a plan view of a portable screen embodying the invention; Fig. 2 a front and elevational view of the same; Fig. 3 a side elevational view of the same; Fig. 4 a cross-section of the screen and frame on line 4—4 of Fig. 1; Fig. 5 a cross-section of the screen on line 5—5 of Fig. 4; Fig. 6 a cross-section on line 6—6 of Fig. 4; Fig. 7 a side view of the resilient connection between the screen frame and the axle; Fig. 8 an end view of the latter connection; Fig. 9 a modified form of the resilient connection between the screen frame and the axle; Fig. 10 a cross-section on line 10—10 of Fig. 9; Fig. 11 a plan view of one of the tension devices for the screening medium; Fig. 12 a cross-section on line 12—12 of Fig. 11; Fig. 13 a front elevational view of the lubricant carrying member of the tension device; Fig. 14 a cross-section on line 14—14 of Fig. 13 and Fig. 15 a side elevational view of the device mounted on a stationary support.

In the illustrative embodiment of the invention the screening medium 1, at its forward end, is engaged between two plates 2, $2^a$, the bolts 3 being passed through both plates. The opposite ends of the plates are supported in the slotted brackets 4 that are attached to the forward ends of two side boards 5 of the main frame which extend along the opposite sides of the medium 1.

The board 6 is secured at its opposite ends to the upper or rear ends of the boards 5. The medium is, therefore, enclosed on three sides and the spaces between the boards and the medium are covered by strips of leather or rubber 7 (Fig. 6) to prevent material fed to the medium from dropping off it at the upper end or at the sides thereof.

A bar 8, preferably formed of wood, extends under and across the medium at substantially its middle and is secured thereto by the bolts 9. The central bolt $9^a$ extends also through a filling block 10 and through the lower end of a cantilever 11 so that the bar 8 is rigidly connected to the cantilever 11. This cantilever is also formed of wood and extends centrally of the medium a suitable distance beyond the rear end of the medium 1. An electric motor 12 is suitably mounted on the extended end of the cantilever and one or more unbalanced pulleys 13 are secured to the shaft of the motor. I preferably extend the motor shaft at opposite ends and mount a pulley on each extension.

Tension is imposed upon the screening medium 1 by two bolts 14 each of which extends through an aperture $6^a$ in the board 6 and through a corresponding aperture in an angle bar 15 that is secured to the rear side of the board 6. The forward end of each bolt is hook-shaped and is projected through alined apertures $16^a$ in two bars 16 that are secured to opposite faces of the upper or rear end of the screening medium by the bolts 17, bars 16 being similar to the bars 2, $2^a$.

Two socketed castings 18 are secured to the outer face of the angle bar 15, each casting having an aperture 19 therein through which the bolt 14 is projected. The face 20 of the socket of each casting is concave and longitudinal channels 21 are formed in said face for the reception of lubricant. A block 22 having a convex face is adapted to engage the concave face of the casting and to be capable of articultion therewith. Lock nuts 23 retain the bolts in longitudinal adjustment. Hence the tension on the screening medium is regulated by turning the nuts 23.

A resilient bar 24, preferably formed of wood, is suitably secured to the lower edges of the side boards 5 and it is secured to the cantilever by the bolt 25. Two blocks 26 are suitably secured to the top side of the bar 24 adjacent opposite ends of the lower bar 16, the top face of each block being covered with a cushion $26^a$, such as rubber, upon which cushion the lower bar 16 may rest.

A resilient bar 27, preferably formed of wood, is disposed between the bars 8 and 24 and is secured at its opposite ends to the side boards 5 and to the cantilever, a filling block 28 being inserted between the bar and the cantilever.

Plates 29 are secured to the outer face of the side boards 5 and extend downwardly therefrom. The lower end of each plate (Figs. 7 and 8) is secured to an angle plate 30 that is secured to the free end of a resilient member or leaf 31 which rests upon a shorter resilient member or leaf 32 engaging a block 33. The block and the resilient members 31 and 32 are secured to an axle 34 by the shackles 35. Wheels 36 are removably mounted on the axle 34. A cushion $30^a$ is preferably attached to the lower side of the member 31 that will abut the axle if the movement of the member is of sufficient extent.

Instead of using the resilient members 31 and 32, I may substitute therefor the connection shown in Figs. 9 and 10, wherein each angle plate 30 is bolted to a two part casting 36, between which parts is the axle 34 and a resilient member 37 such as rubber. If the axle is sufficiently resilient the resilient connecting members may be omitted entirely and the angle plates 30 secured directly to the axle.

Near the forward end of the side boards is a support or leg 38 preferably having a resilient cushion 39 at its lower end adapted to rest on the ground or floor. Each side member 40 of this support is provided with several apertures 41 through any one of which a bolt 42 may be extended and projected through the side board. The inclination of the screening medium is, therefore, regulated by adjusting the support 38.

A cover 43 may be hinged to the board 6 to cover the electric motor.

The wheels may be removed and the axle engaged in suitable bearings 44 formed on a fixed structure 45, a platform 46 being carried by the structure or otherwise formed upon which to engage the support 38. In the latter installation the device is now stationary, but its parts and operation are exactly the same as when the wheels are installed.

In operation, the electric motor rotates the unbalanced pulleys which pulleys cause the cantilever to vibrate, the degree of vibration being greatest at the lower or forward end, where it is attached to the screening medium.

It is desirable that the electric motor shall vibrate as little as possible when the device is in operation. The vibration of the cantilever is restrained by the resilient cross members 24 and 27 so that while a maximum vibration of the cantilever is accomplished at its forward end or point of attachment to the screening medium, the vibration of the cantilever adjacent to the motor is very slight and not harmful thereto. The member 27 is more resilient than the member 24 and as they are bolted to the cantilever they tend to restrain or stiffen it, the member 24 causing a greater restraint on the cantilever than that caused by the member 27. Hence the restraint on the cantilever is gradually increased toward its rear or motor end while its forward end is free to vibrate with maximum effect. I may cause the screening medium to vibrate with an amplitude of $\frac{5}{16}$th of an inch.

The member 24 is also given a slight twisting movement as the cantilever is vibrated so that the motion of the medium is free and uniform.

What I claim is:

1. A vibrating screen comprising a frame, means to support the frame in adjustable inclined position, a screening medium supported on the frame, means connected to the screening medium and cooperating with the frame to place tension on said medium, a cantilever beneath and extending longitudinally of the screening medium and connected at one end to said medium, means mounted at the opposite end of the cantilever to cause it to vibrate and a resilient member secured to the frame and extending across the same beneath the screening medium and also secured to the central portion of the cantilever.

2. A vibrating screen comprising a frame, means to resiliently support the frame, a resilient member secured at its opposite ends to the frame and extending transversely across the same, a resilient cantilever secured in its central portion to the resilient member and extending longitudinally of the frame, a screening medium mounted on the frame above the cantilever and connected to one end thereof, the latter connection being substantially to the middle portion of the said medium, supports on the resilient member adapted to be abutted by one end of the said medium, a second transverse resilient member secured to the frame and extending beneath and across the said mechanism, said latter member having greater resilience than the first named resilient member, and means at the other end of the cantilever to cause it to vibrate.

3. A vibrating screen comprising a frame, a screening medium supported on the frame, means connected to the screening medium and cooperating with the frame to place tension on said medium, a cantilever beneath and extending longitudinally of the screening medium and connected at one end to said medium, means mounted at the opposite end of the cantilever to cause it to vibrate and a resilient member secured to the frame and extending across the same beneath the screening medium and also secured to the central portion of the cantilever.

In witness whereof I have hereunto signed my name this 17th day of September.

EMIL DEISTER.